(12) United States Patent
Garland et al.

(10) Patent No.: US 6,425,618 B1
(45) Date of Patent: Jul. 30, 2002

(54) ARTICULATING CARGO BED EXTENDER

(75) Inventors: Travis Steven Garland, Dearborn; Warren L. Nally, South Lyon; Ronald J. Brzuch, Canton; Burt E. Sloan, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,099

(22) Filed: Jul. 19, 2001

(51) Int. Cl.[7] .................................................. B60P 3/00
(52) U.S. Cl. ........................ 296/3; 296/26.11; 224/405; 224/484
(58) Field of Search .............................. 296/3, 7, 26.08, 296/26.11, 32, 34, 37.6, 57.1; 224/402, 403, 405, 484, 495, 501, 502, 551

(56) References Cited

U.S. PATENT DOCUMENTS 5,037,152 A * 8/1991 Hendricks ....................... 296/3
5,700,047 A 12/1997 Leitner et al.
5,911,464 A * 6/1999 White ....................... 296/26.11

* cited by examiner

Primary Examiner—Joseph D. Pape
Assistant Examiner—Patricia Engle

(57) ABSTRACT

An extendable support mechanism for a cargo bed of a pickup truck or the like. One or more support members are attached to opposite sides of the cargo bed and adapted to be positioned vertically upwardly from the cargo bed in order to support a tent-like structure or an object which is also positioned in part on the cab of the vehicle. Preferably, three tubular support members are provided in the support mechanism. Each of the tubular members are comprised of two telescopic members and are extendable in order to vary the height of the support member in the vertical direction in order to be used to hold members on the top of the vehicle. The support mechanism can be attached to an articulating bracket member which allows the support member also to be used as a cargo bed extender when desired, and also to be rotated to a stored position inside the cargo bed. In an alternate embodiment, the support members are held in vertical position on the sides of the cargo bed by fixed bracket members.

20 Claims, 3 Drawing Sheets

US 6,425,618 B1

ARTICULATING CARGO BED EXTENDER

BACKGROUND OF INVENTION

The present invention relates to accessory devices for use in cargo beds of pickup trucks and other vehicles.

Various devices and systems have been proposed and utilized for providing increased size and effectiveness of cargo beds in pickup trucks and other vehicles. Pickup trucks and other vehicles with open cargo areas typically have open top box-type structures with hinged tailgate members. Various accessory products have been provided for use in increasing the size, use and effectiveness of such cargo beds. These products include, for example, molded liners, mesh or web-type devices for use with or in place of tailgate members, tool boxes which fit behind the cab and extend into the cargo bed, tonneau covers, and cargo bed extenders. Known cargo bed extenders include a fence-type structure which extends toward the rear of the vehicle over the tailgate providing more volume and carrying capacity for the cargo bed.

There is a need for additional accessory items for cargo beds, such as devices which allow ease of transport of long items, such as lumber and boats, or devices which allow increased covered capacity of the cargo bed which are removable and not permanent.

SUMMARY OF INVENTION

It is the purpose of the present invention to provide a more advantageous and versatile accessory item for a pickup truck or other vehicle with a cargo bed. The present invention has multiple uses including extending and increasing the cargo capacity of the cargo bed, both in the vertical and horizontal directions. The present invention also provides a structure which can be varied in height to allow items to be carried over the cargo bed if desired and be supported in part by the roof of the vehicle. In this manner, water vehicles, such as row boats, canoes, and kayaks, can be balanced on the vehicle cab and accessory structure. The present invention also provides a versatile structure which can be raised or lowered as desired and can provide a structure or framework for covering the cargo bed in a tent-like manner.

In accordance with the present invention, an articulating and extendable structure is provided for attachment to a cargo bed. The structure includes one or more frame or support members which have telescopic or extendable sections allowing the structure to be extended as desired in order to provide more cargo space or increased height of the volume of the cargo bed. Preferably, three metal tubular members are provided which are rotatable brackets on opposite sides of the cargo bed. The tubular members can be rotated to positions inside the cargo bed for storage, outside the end of the cargo bed to extend the volume or capacity of the cargo bed, or in a vertical manner in order to provide a support for a tent-like structure or for carrying a canoe or the like. The tubular members are each extendable telescopically in order to allow the structure to be raised or lowered depending on the desired height for carrying another device or structure, such as a canoe or row boat.

Spring actuated pin members are utilized in combination with a series of locking holes or openings in the sides of the cargo bed in order to allow the brackets and support structure to be rotated on the sides of the cargo bed to and from its storage and use positions.

In an alternate embodiment, a separate support structure can be provided with one or more tubular members which are extendable or telescopic and which fit within rigid, non-rotating brackets on the sides of the cargo bed. This structure can be positioned in the support brackets and positioned vertically relative to the floor of the cargo bed in order to provide support for carrying structures above the cargo bed and on top of the vehicle, or for supporting a tent-like structure.

Detailed Description

Figure 1:
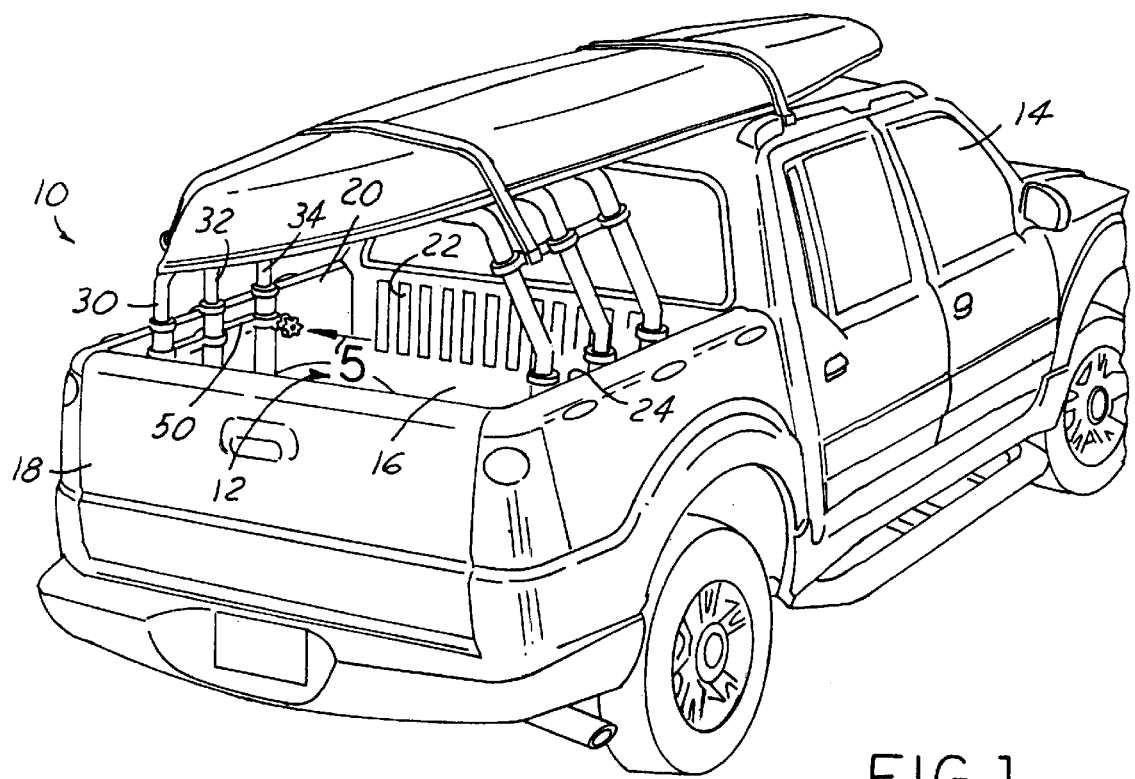
FIG. 1 illustrates a vehicle with a cargo bed illustrating use of the present invention.

A preferred embodiment of the present invention is shown in FIGS. 1–5 and is generally referred to by the reference numeral 10. The invention 10 is adapted for use in the cargo bed 12 of the pickup truck 14 or the like. It is obvious that the present invention can be used in any vehicle which has an open top cargo area. For example, the present invention can be used with trailers which are adapted to be towed behind vehicles.

The cargo bed 12 of the vehicle 14 has an open top 16, a rotatable tailgate member 18, and three vertically oriented side wall members 20, 22, and 24. Two of the wall members, namely members 20 and 24, are positioned opposite one another and are adapted to hold and retain the present invention 10 in position in the cargo bed 12 of the vehicle 14.

In a preferred embodiment of the present invention, the extendable support mechanism 10 includes a plurality of tubular members, 30, 32, and 34, three of which are preferably provided. It is understood, of course, that the present invention can comprise any number of tubular members. It is also understood that the present invention can utilize one or more solid support members and have any cross-sectional size and configuration, so long as the support mechanism operates in substantially the same manner as the present invention and achieves substantially the same results. For ease of describing the present invention, however, it will be described with reference to three tubular members 30, 32, and 34.

In a preferred embodiment, the support mechanism 10 can be utilized as a cargo bed extender, as well as an extendable telescopic support structure for carrying large objects on the roof of the vehicle 14. Such an embodiment is shown in FIGS. 1–5. As shown in FIG. 2, the three tubular members 30, 32, and 34 are held together in a framework by a plurality of support spacer members 40. The support members hold the tubular members in spaced apart positions. Preferably, the support/spacer members 40 are molded two-piece members molded from a plastic material and fastened or otherwise securely fastened together on the three tubular members 30, 32 and 34, as shown. In FIG. 2, four support/spacer members 40 are provided, although it is understood that any number can be provided as necessary for adequate support of the tubular members 30, 32, and 34. The support/spacer members can be made of any material, including a metal material, as desired.

Preferably, the support members 30, 32, and 34 are made from a tubular material, such as aluminum or stainless steel, in order to provide a strong lightweight structure which can be easily articulated to its storage and use positions.

The ends of the three support members 30, 32, and 34 are secured in a rotatable bracket member 50 which also is preferably a two-piece molded plastic member. The bracket 50 is secured to the ends of the three tubular support members 30, 32, and 34 as shown. Although only one bracket member 50 is shown in the drawings, it is understood that a pair of bracket members 50 are provided, one on each sidewall member 20 and 24 of the cargo bed. Only one of the bracket members 50 will be described in detail, since the other bracket member is identical and used in the same manner.

Figure 2:
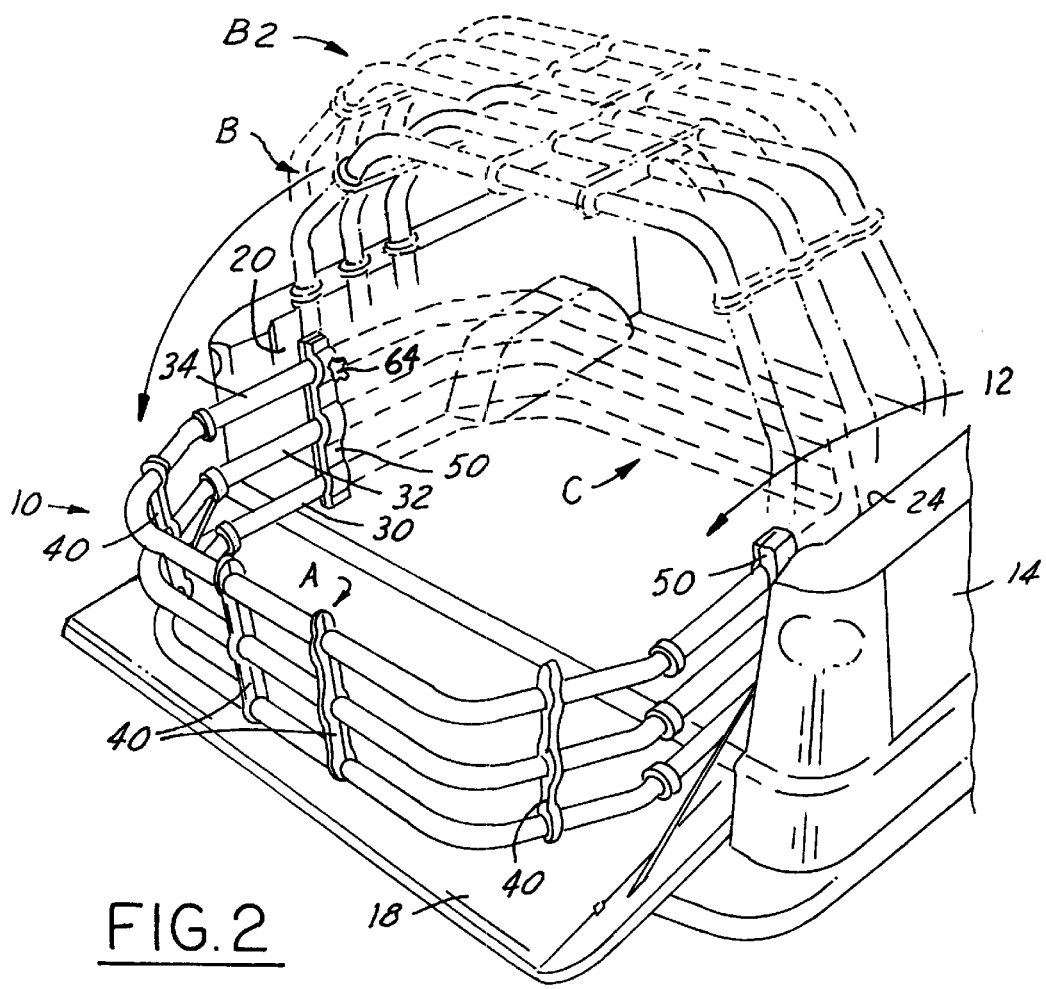
FIG. 2 illustrates a preferred embodiment of the present invention showing the basic use and storage positions.
Figure 3:
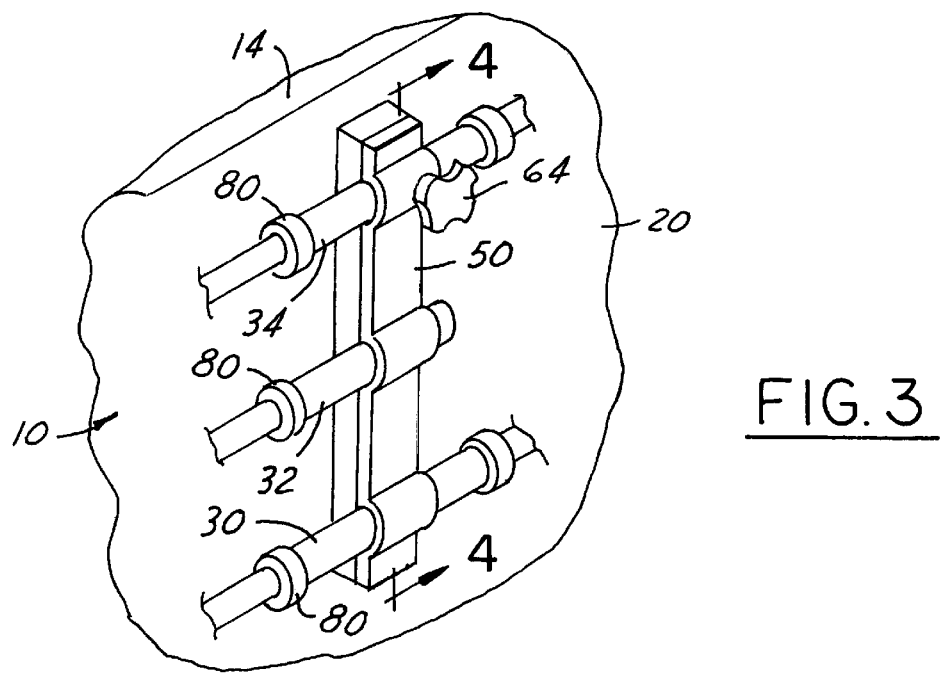
FIG. 3 illustrates a preferred rotatable bracket member for use with the present invention.

The bracket member 50 is secured to a sidewall member of the vehicle 14 by a rotatable mechanism 52. The bracket member 50 can be rotated preferably to three positions, as shown in FIGS. 2 and 3. In a first position A, the support mechanism 10 is used as a cargo bed extender. In this position, the support mechanism 10 provides an extended volume or carrying capacity for the cargo bed 12.

In a second position B, the support mechanism 10 is positioned essentially vertical so it can be used to either increase the cargo capacity in a vertical manner, used to support a canoe, kayak, row boat or the like (as shown in FIG. 1), or used to support a tent or tent-like structure.

Figure 4:
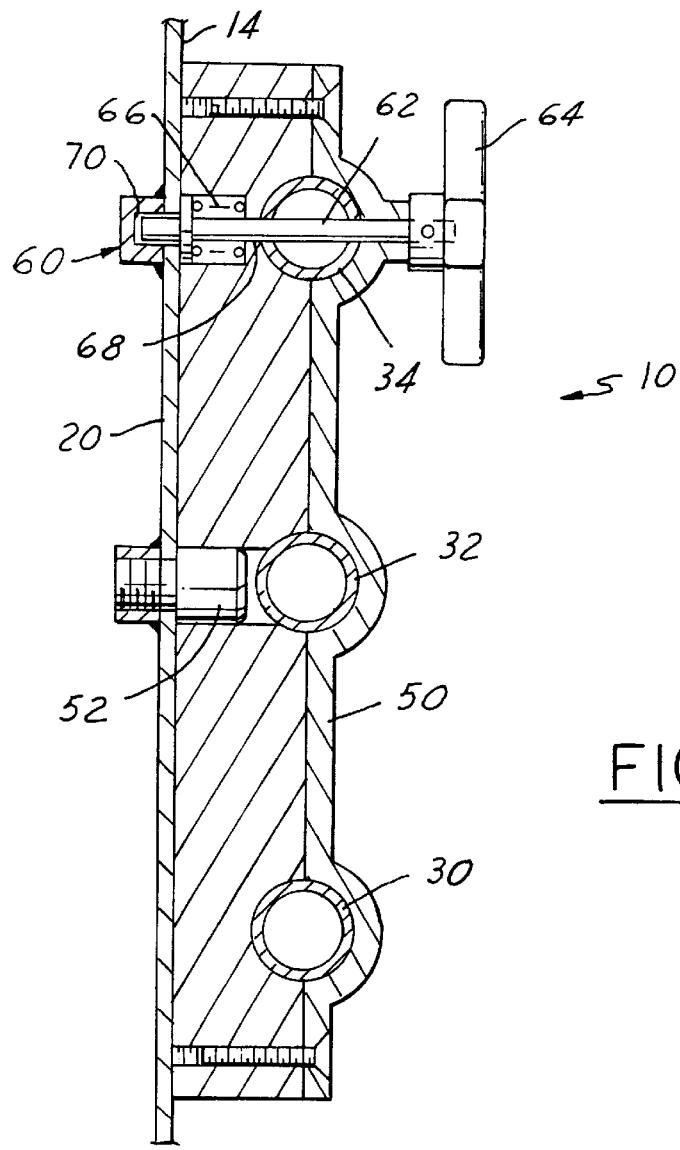
FIG. 4 is a cross-section of the bracket member shown in FIG. 3, the cross-section taken along lines 4—4 in FIG. 3.

In a third position C, the support structure 10 is rotated to a stowed or storage position inside the cargo bed. In either position B or C, the tailgate member 18 can be rotated to its closed upright position.

spring-biased pin mechanism 60 is used to hold the bracket member 50 and thus the support mechanism 10 in the three positions, A, B, and C. The pin mechanism 60 includes a pin member 62 attached to a manually-operable handle member 64. A spring member 66 holds the pin member 60 in a locked position as shown in FIG. 4. The pin mechanism 60 can be manually withdrawn along channel 68 in the bracket member 50 allowing the bracket member 50 to be rotated to the various positions described above. In each of the use and storage positions of the support mechanism 10, a recess 70, which is positioned to align with the pin member 62, is provided in the sidewall members 20 and 24 of the cargo bed. In this manner, when the bracket member 50 is rotated to the desired position, the pin member 62 is manually operated by the handle member 64 in order to be inserted into the appropriate recess or opening 70 in the cargo bed. This holds the bracket member 50 and thus the support mechanism 10 in the appropriate position relative to the cargo bed.

Figure 5:
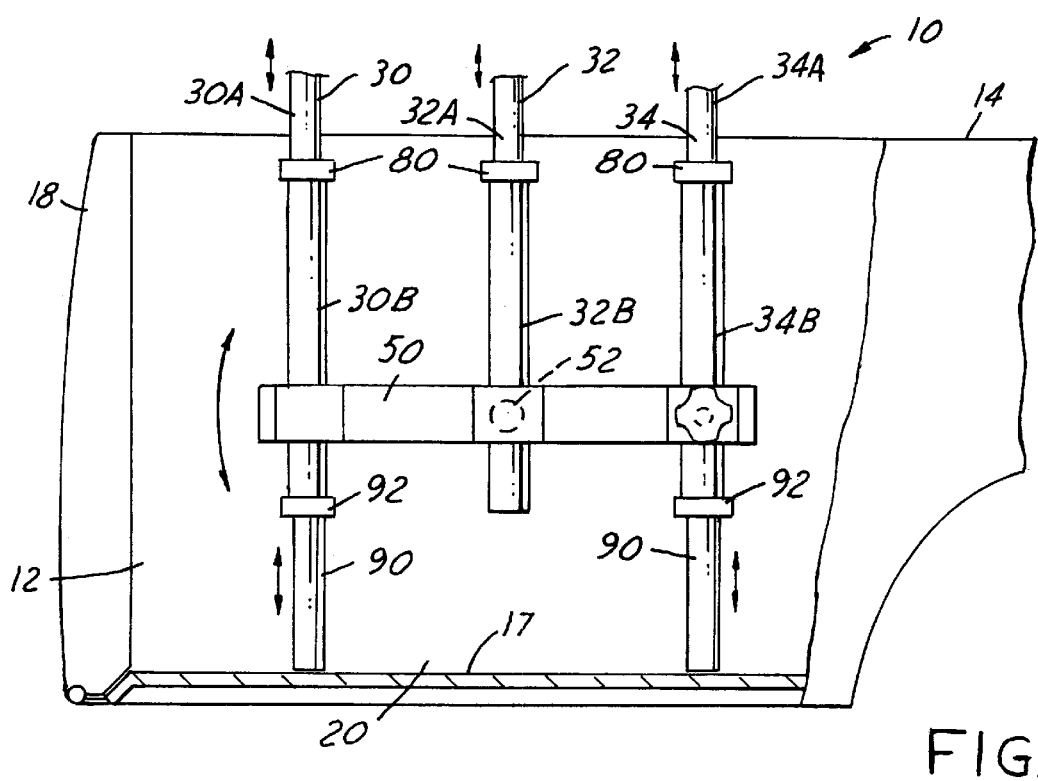
FIG. 5 is a partial view of the present invention depicting the telescopic/extendable feature of the present invention.

Each of the tubular members 30, 32, and 34 is extendable, which allows the support mechanism to be raised or lowered in order to be set at an appropriate height for carrying of objects on the top of the vehicle. For this purpose, each of the support members include a pair of tubular members which are slightly different in size in order to allow one to be telescopically extendable within the other. As shown in FIG. 5, each of the tubular members 30, 32, and 34 comprise a pair of telescopic connector members 30A–30B, 32A–32B, and 34A–34B, respectively.

Rotatable friction-type locking mechanisms 80 are provided at the intersection or juncture of the two telescopic members of each of the support members 30, 32, and 34. The locking members 80 are adapted to be rotated manually in one direction in order to allow free telescopic positioning of the tubular members 30A–30B, 32A–32B, and 34A–34B relative to one another, and also to be rotated in the opposite direction in order to lock and hold the two telescopic members tightly in the desired position. As shown in FIG. 2, the support mechanism 10 when rotated to the second position B typically has a height which is typically not level with the roof of the cab. In order to make the two structures level horizontally in the same plane, the support mechanism 10 is raised to position B2. This position is also shown in FIG. 1 where a canoe is attached to the top of the vehicle 14. In order to extend the support structure 10, each of the locking mechanisms 80 is rotated releasing the tubular members 30A, 32A and 34A. The support members are then raised to the desired position and the locking members 80 are manually rotated in the opposite direction in order to lock the support members in place.

Although rotating-type frictional locking mechanism 80 are shown for use with the present invention, and a spring-biased pin mechanism 60 is utilized to hold the bracket member 50 in position, it is understood that any conventional releasable locking mechanism for use with solid or tubular members can be utilized, as well as any type of manually activated attachment mechanism for holding the bracket 50 in its various positions. In this regard, it is also possible to provide a means for allowing the bracket member 50 and thus the support mechanism 10 to be positioned in more than the three positions A, B, and C described above. In fact, the support mechanism 10 can be positioned, if desired, and appropriate locking and holding mechanisms provided, anywhere between positions A and C.

Telescopic leg mechanisms 90, as shown in FIG. 5, can also be provided as desired for increased stability of the support mechanism 10 when it is positioned in a vertical position B. For this purpose, telescopic leg mechanisms 90 can be provided in any or all of the tubular support members 30, 32, and 34. Releasable locking mechanisms 92, which are substantially the same as locking mechanisms 80, can be provided in order to allow the telescopic leg members 90 to be raised and lowered as desired. In this regard, as shown in FIG. 5, with the leg members 90 extended against the bed or bottom 17 of the cargo bed 12 of the vehicle 14, stability is provided relative to the support members when they are in the vertical upright position.

Figure 6:
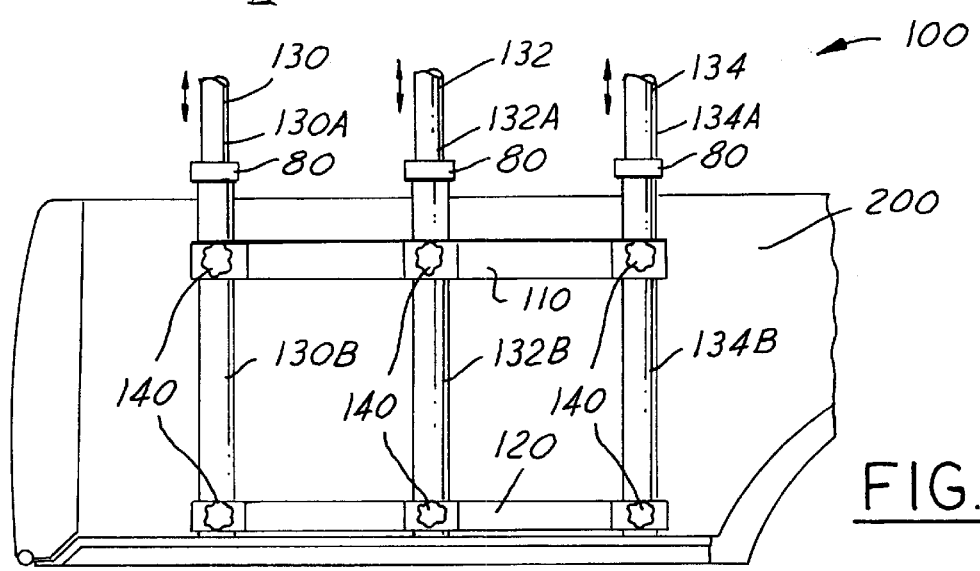
FIG. 6 shows an alternate embodiment of the present invention.

An alternate embodiment of the present invention is shown in FIG. 6. In this embodiment, the support mechanism 100 is separate and distinct from a cargo bed extender. In this embodiment, the three support members 130, 132, and 134 are adapted to be positioned in one or more support brackets 110 and 120 which are fixedly attached and positioned on the sidewall member 200 of the vehicle 14. In this regard, a pair of support brackets 110 and 120 are provided on each of the two opposite sidewall members of the cargo bed of the vehicle in order to hold the opposite ends of the support mechanism 100 in position.

In the same manner as the support mechanism 10 described above, each of the tubular support members 130, 132, and 134 comprise two telescopic tubular members 130A–130B, 132A–132B, and 134A–134B, respectively. Preferably, manually rotatable turn lock members 140 are provided in order to releasably hold the two telescopic portions of the support members in position as desired. In this manner, when it is not desired to utilize the support members with the vehicle, they can be released from the brackets and removed from the cargo bed.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A support mechanism for a vehicle cargo bed comprising:
   two pairs of bracket members for attachment to opposite side walls of the cargo bed; and
   a support device having a center portion and two end portions, each of the end portions being positioned in one of said two pairs of bracket members;
   said bracket members being adapted to be positioned substantially horizontally in the cargo bed in order to position said support device in essentially a vertical position;
   said support device being vertically adjustable relative to the cargo bed.

2. The support mechanism as described in claim 1 wherein said support device has three support members.

3. The support mechanism as described in claim 1 wherein said support device has at least two support members and each support member is extendable.

4. The support mechanism as described in claim 3 wherein each of said support members comprises a pair of telescopic tubular members which are adjustable relative to one another.

5. The support mechanism as described in claim 4 further comprising a releasable locking device on each telescopic tubular member in order to releasably retain the telescopic tubular members in a desired position.

6. The support mechanism as described in claim 3 further comprising spacer members in order to hold said support members in spaced apart positions.

7. The support mechanism as described in claim 1 wherein said bracket members are rotatable relative to the cargo bed in order to position said support device at various positions and orientations therein.

8. The support mechanism as described in claim 7 further comprising a releasable positioning member for holding said rotatable bracket members in one of a variety of positions.

9. The support mechanism as described in claim 4 wherein at least one of said support members includes a second extendable telescopic foot member for stabilizing said support device relative to the cargo bed.

10. The support mechanism as described in claim 7 wherein said support device is adapted to be positioned in a cargo bed extender position, a substantially vertical position and a cargo bed stowed position.

11. A support structure for a cargo bed of a vehicle, the cargo bed having a floor member, a front wall member, a pair of opposed sidewall members, and a rear tail gate member, said support structure comprising:
   a first pair of bracket members rotatably attached to a first of said pair of opposed sidewall members;
   a second pair of bracket members rotatably attached to the second of said pair of opposed sidewall members; and
   a support device comprising at least one tubular support member, said tubular support member having a first end portion attached to said first pair of bracket members, a second end portion attached to said second pair of bracket members, and a center support portion positioned between said first and second end portions;
   said center support portion being telescopically positioned in said first and second end portions whereby said center support portion can be extended outwardly relative to said first and second end portions;
   said first and second pair of bracket members being rotatable relative to said cargo bed wherein said support device can be positioned in a first position substantially parallel to said floor member and a second position substantially perpendicular to said floor member.

12. The support structure as described in claim 11 wherein said support device comprises three tubular support members, said three tubular support members being arranged substantially parallel to each other and held in that position by at least one spacer member.

13. The support structure as described in claim 11 further comprising locking mechanisms on each of said first and second end portions for releasably securing said center support portion in a predetermined position relative to said first and second end portions.

14. The support structure as described in claim 11 further comprising means for releasably securing said first and second pairs of bracket members in predetermined positions on said sidewall members.

15. A support mechanism for a vehicle cargo bed comprising:
   at least one pair of rotatable bracket members for attachment to opposite side walls of the cargo bed;
   a support device having a center portion and two end portions, each of the end portions being positioned in one of said pair of bracket members;
   said rotatable bracket members being adapted to be positioned substantially horizontally in the cargo bed in order to position said support device in essentially a vertical position;
   said support device being adjustable vertically relative to the cargo bed; and
   at least one telescopic foot member for stabilizing said support device relative to the cargo bed.

16. The support mechanism as described in claim 15 wherein two pairs of bracket members are provided for attachment to said end portions.

17. The support mechanism as described in claim 15 wherein said support device has at least two support members and each support member is extendable.

18. The support mechanism as described in claim 17 wherein each of said support members comprises a pair of telescopic tubular members which are adjustable relative to one another.

19. The support mechanism as described in claim 18 further comprising a releasable locking device on each telescopic tubular member in order to releasably retain the telescopic tubular members in a desired position.

20. The support mechanism as described in claim 15 further comprising a releasable positioning member for holding said rotatable bracket members in one of a variety of positions.

* * * * *